(12) United States Patent
Liang et al.

(10) Patent No.: US 8,660,052 B2
(45) Date of Patent: Feb. 25, 2014

(54) METHOD, BASE STATION AND USER EQUIPMENT FOR TRANSMITTING AND ACQUIRING CONTROL INFORMATION IN BROADCAST MULTICAST SYSTEM

(75) Inventors: Jing Liang, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 353 days.

(21) Appl. No.: 13/278,881

(22) Filed: Oct. 21, 2011

(65) Prior Publication Data

US 2012/0039237 A1     Feb. 16, 2012

Related U.S. Application Data

(63) Continuation of application No. PCT/CN2010/071811, filed on Apr. 16, 2010.

(30) Foreign Application Priority Data

Apr. 22, 2009  (CN) .......................... 2009 1 0082928

(51) Int. Cl.
*H04W 4/06* (2009.01)
*H04W 36/04* (2009.01)
*H04W 48/10* (2009.01)

(52) U.S. Cl.
USPC ............ 370/312; 370/254; 370/329; 370/338

(58) Field of Classification Search
USPC .................. 370/252, 254, 328, 329, 330, 338
See application file for complete search history.

(56) References Cited

U.S. PATENT DOCUMENTS

| 8,000,292 B2 * | 8/2011 | Cai et al. ........................ 370/329 |
| 8,300,566 B2 * | 10/2012 | Kuo ............................... 370/312 |
| 8,477,675 B2 * | 7/2013 | Cai et al. ........................ 370/312 |
| 2009/0147717 A1 * | 6/2009 | Cai ................................ 370/312 |

FOREIGN PATENT DOCUMENTS

| CN | 101267593 A | 9/2008 |
| CN | 101370239 A | 2/2009 |
| WO | 2009/041775 A2 | 4/2009 |

OTHER PUBLICATIONS

International Search Report for International Patent Application No. PCT/CN2010/071811, dated Jul. 22, 2010, and English translation thereof.
Chinese Office Action for Chinese Patent Application No. 200910082928.8, dated Apr. 27, 2012, and English translation thereof.

\* cited by examiner

*Primary Examiner* — Ahmed Elallam (57) ABSTRACT

Various embodiments provide a method for transmitting control information in a broadcast multicast system, the method includes: broadcasting identifier information of N Multicast Broadcast Single Frequency Network (MBSFN) areas to which the current cell belongs through a system message wherein N is an integer with N>1; transmitting indication information of control information of the N MBSFN areas through a system message or a Radio Resource Control (RRC) message; and transmitting the control information of the N MBSFN areas respectively through a Multicast Control Channel (MCCH) of the current cell according to the indication information. Various embodiments can guarantee normal working of a UE when the UE is located in an area overlapped by multiple MBSFN areas.

16 Claims, 4 Drawing Sheets

METHOD, BASE STATION AND USER EQUIPMENT FOR TRANSMITTING AND ACQUIRING CONTROL INFORMATION IN BROADCAST MULTICAST SYSTEM

CROSS-REFERENCE TO RELATED APPLICATIONS

This application is a continuation of International Application No. PCT/CN2010/071811 filed on Apr. 16, 2010. This application claims the benefit and priority of Chinese Patent Application No. 200910082928.8, filed Apr. 22, 2009. The entire disclosures of each of the above applications are incorporated herein by reference.

FIELD

The present disclosure relates to a technical field of mobile communications, and more particularly, relates to a method, a base station and a User Equipment (UE) for transmitting and acquiring control information in a broadcast multicast system.

BACKGROUND

This section provides background information related to the present disclosure which is not necessarily prior art.

In a Long Term Evolution (LTE) system, a Multimedia Broadcast Multicast Service (MBMS) is also called an evolution Multimedia Broadcast Multicast Service (eMBMS), and is mainly to realize broadcast and multicast services in the LTE system. Usually, one MBMS service area includes more than one Multicast Broadcast Single Frequency Network (MBSFN) area and one MBSFN area may include one or more cells.

In the MBMS of LTE Release 9 (R9), one cell belongs to only one MBSFN area. There are no overlapped MBSFN areas. There is only one Multicast Control Channel (MCCH) in one cell, and the MCCHs of different cells in the same MBSFN area can be combined where the MCCH is a point-to-multipoint downlink channel which is adapted to transmit control information of the MBMS area from network side to a UE.

In the MBMS of LTE R10, there are overlapped MBSFN areas. Some cells may belong to two or more MBSFN areas at the same time. However, the method for transmitting the control information of MBMS in the prior art is that a base station transmits the control information of various cells' MBSFN area through the various cells' respective MCCHs, so that when a UE enters an MBMS network of LTE R10 and the services to be acquired by the UE belong to different MBSFN areas, the UE fails to work normally because the UE can only work on the MCCH of the current cell, i.e., the cell in which the UE currently camps on or connects to.

SUMMARY

This section provides a general summary of the disclosure, and is not a comprehensive disclosure of its full scope or all of its features.

In view of the above, various embodiments provide a method, a base station and a UE for transmitting and acquiring control information in a broadcast multicast system, so as to guarantee that the UE can work normally when it is located at an area including multiple overlapped MBSFN areas.

A method for transmitting control information in a Broadcast Multicast Service system includes:

broadcasting identifier information of N MBSFN areas to which the current cell belongs through a system message wherein N is an integer with N>1; transmitting indication information of control information of the N MBSFN areas through a system message or an RRC message; and transmitting the control information of the N MBSFN areas respectively through an MCCH of the current cell according to the indication information.

A method for acquiring control information in a broadcast multicast system includes:

acquiring identifier information of N MBSFN areas to which the current cell belongs from a system message received wherein N is an integer with N>1; acquiring indication information of control information of the N MBSFN areas through a system message or an RRC message; and acquiring the control information of the N MBSFN areas through an MCCH of the current cell according to the indication information.

A base station, applied in a broadcast multicast system, includes an identifier information transmission unit, an indication information transmission unit and a control information transmission unit; wherein the identifier information transmission unit is to broadcast identifier information of N MBSFN areas to which the current cell belongs through a system message wherein N is an integer with N>1. The indication information transmission unit is to transmit indication information of control information of the N MBSFN areas through a system message or an RRC message, and the control information transmission unit is to transmit the control information of the N MBSFN areas respectively through an MCCH of the current cell according to the indication information.

A User Equipment (UE), applied in a broadcast multicast system, includes an identifier information acquiring unit, an indication information acquiring unit and a control information acquiring unit, wherein the identifier information acquiring unit is to acquire identifier information of N MBSFN areas to which the current cell belongs from a received system message wherein N is an integer with N>1. The indication information acquiring unit is to acquire indication information of control information of the N MBSFN areas from a system message or an RRC message; and the control information acquiring unit is to acquire the control information of the MBSFN areas from an MCCH of the current cell according to the indication information.

It can be seen from the aforementioned technical solutions, in the various embodiments, identifier information of N MBSFN areas to which the current cell belongs is broadcasted through a system message where N is an integer with N>1, indication information of control information of the N MBSFN areas is transmitted through a system message or RRC message, and the control information of the N MBSFN areas is transmitted through the MCCH of the current cell according to the indication information respectively. Various embodiments enable a UE of LTE R9 to acquire corresponding control information to guarantee the UE's normal working when the UE is located in an area including multiple overlapped MBSFN areas and needs to acquire services belonging to different MBSFN areas by providing the control information of the N MBSFN areas through the MCCH of the current cell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Various embodiments provide broadcasting identifier information of N MBSFN areas to which the current cell belongs through a system message where N is an integer with N>1, transmitting indication information of control information of the N MBSFN areas respectively through a system message or Radio Resource Control (RRC) message, and transmitting the control information of the N MBSFN areas respectively according to their respective indication information through an MCCH.

In various embodiments, the control information of the N MBSFN areas may be carried respectively in N MCCH information blocks, in which one MCCH information block carries the control information of one MBSFN area where the indication information of the control information of the NBSFN areas transmitted through the system message or RRC message may include a correspondence relationship between identifiers of the MBSFN areas and the MCCH information blocks.

Figure 1:
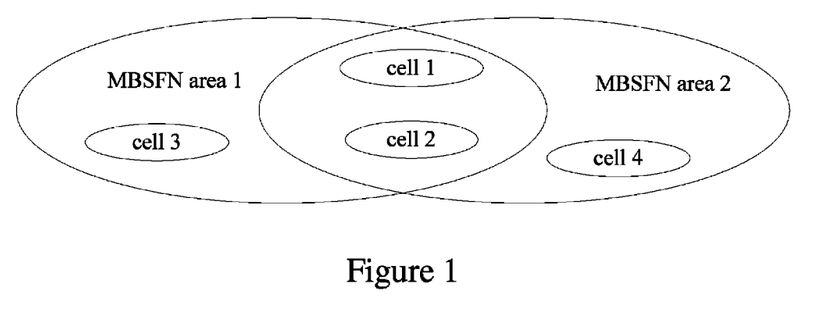
FIG. 1 is a diagram showing a networking structure of an MBMS system.

The above method is described in detail through specific embodiments as follows. In an example of the diagram of the networking structure as shown in FIG. 1, MBSFN area 1 and MBSFN area 2 are two overlapped MBSFN areas in an MBMS system, both cell 1 and cell 2 belong to the overlapped area of the two MBSFN areas, cell 3 only belongs to MBSFN area 1, and cell 4 only belongs to MBSFN area 2.

Taking the base station of cell 1 as an example, the base station of cell 1 may broadcast identifier information of MBSFN area 1 and MBSFN area 2 through a system message on a Broadcast Control Channel (BCCH) because cell 1 belongs to both MBSFN area 1 and MBSFN area 2 simultaneously. Specifically, the identifier information of the MBSFN area may be carried through an extra System Information Block (SIB) added into the system message or an extended SIB based on an existing SIB in the system message. The identifier information of MBSFN area 1 and MBSFN area 2 is also broadcasted through the system message for cell 2, the system message for cell 3 may be used to broadcast only the identifier information of MBSFN area 1, and the system message for cell 4 may be used to broadcast only the identifier information of MBSFN area 2.

In addition, the MCCHs of different cells within the same MBSFN area may be combined in some circumstances, where each cell in the same MBSFN area may broadcast the identifier information of the local MBSFN area as well as identifier information of another MBSFN area which overlaps the local MBSFN area, e.g., the system messages for cell 3 and cell 4 may be used to broadcast the identifier information of both MBSFN area 1 and MBSFN area 2.

Accordingly, by reading the system message, the UE may acquire the identifier information of the MBSFN area to which the current cell belongs, i.e., indicating which MBSFN area(s) the current cell belongs to.

The base station may transmit the indication information of the control information of each MBSFN area through a system message or an RRC message, and the UE may acquire the control information of each MBSFN area respectively from a corresponding position according to the indication information.

When the control information of each MBSFN area being carried in each MCCH information block is transmitted through the MCCH, the indication information of the control information of each MBSFN area may specifically include a correspondence relationship between an identifier of each MBSFN area and each MCCH information block, and may also include a transmission period of the MCCH information block, occupied radio frame(s) and sub-frame(s), an MCS format and etc. The indication information may further include the number of the MCCH information blocks or a type indication of each MCCH information block's control information. The type indication of each MCCH information block's control information is to notify the UE of which type(s) of control information of the MBSFN area is(are) specifically included in each MCCH information block.

The indication information of the control information of the above various MBSFN areas may be carried in one system message or RRC message, and alternatively, may be carried in multiple system messages or RRC messages.

In addition, the control information of various MBSFN areas may be carried in one RRC message or multiple RRC messages.

I. When the control information of various MBSFN areas is carried in one RRC message, the indication information of the control information of the various MBSFN areas carried in the system message and RRC message for cell 1 may be as shown in Table 1.

TABLE 1

| | |
|---|---|
| the number of MCCH information blocks | 2 |
| the type indication of the control information of MCCH information block 1 | MBMS service information of MBSFN area 1: Service 1 and Service 2 |
| | MBMS radio resource configuration information of MBSFN area 1 |
| | MBMS service scheduling information of MBSFN area 1 |
| | other related information of MBSFN area 1 |
| the type indication of the control information of MCCH information block 2 | MBMS service information of MBSFN area 2: Service 3 and Service 4 |
| | MBMS radio resource configuration information of MBSFN area 2 |
| | MBMS service scheduling information of MBSFN area 2 |
| | other related information of MBSFN area 2 |

During transmission of specific control information of each MBSFN area, according to instruction of Table 1, the control information of MBSFN area 1 is carried in MCCH information block 1, the control information of MBSFN area 2 is carried in MCCH information block 2, and the control information of MBSFN areas 1 and 2 is transmitted to the UE through the MCCH. Specifically, the control information of one MBSFN area may include any of any combination of: the MBMS service information of the MBSFN area, the MBMS radio resource configuration information, MBMS service scheduling information and other related information.

Figure 2:
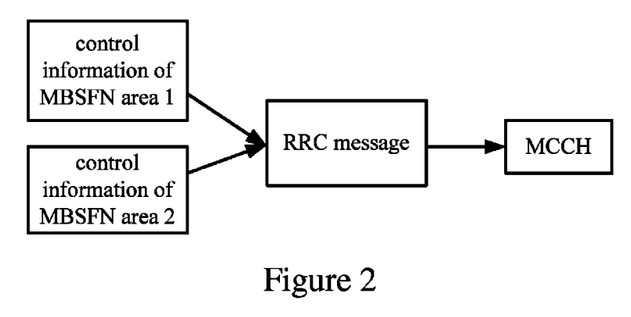
FIG. 2 is a diagram showing an information mapping relationship provided by various embodiments.

In this case, various MCCH information blocks are mapped to one RRC message which is then mapped to one MCCH, the mapping relationship of them may be as shown in FIG. 2.

II. When the control information of various MBSFN areas is carried in multiple RRC messages, the indication information of the control information of the various MBSFN areas carried in the system message and RRC message for cell 1 may be as shown in Table 2.

As shown in Table 2, each of the system messages or RRC messages may only carry one type of indication information of the control information for one MCCH information block.

Similarly, during transmission of specific control information of each MBSFN area, according to instruction of Table 2, the control information of MBSFN area 1 is carried in MCCH information block 1, the control information of MBSFN area 2 is carried in MCCH information block 2, and the control information of MBSFN areas 1 and 2 is transmitted to the UE through the MCCH. Specifically, the control information of one MBSFN area may include any of any combination of: the MBMS service information of the MBSFN area, the MBMS radio resource configuration information, MBMS service scheduling information and other related information.

Figure 3:
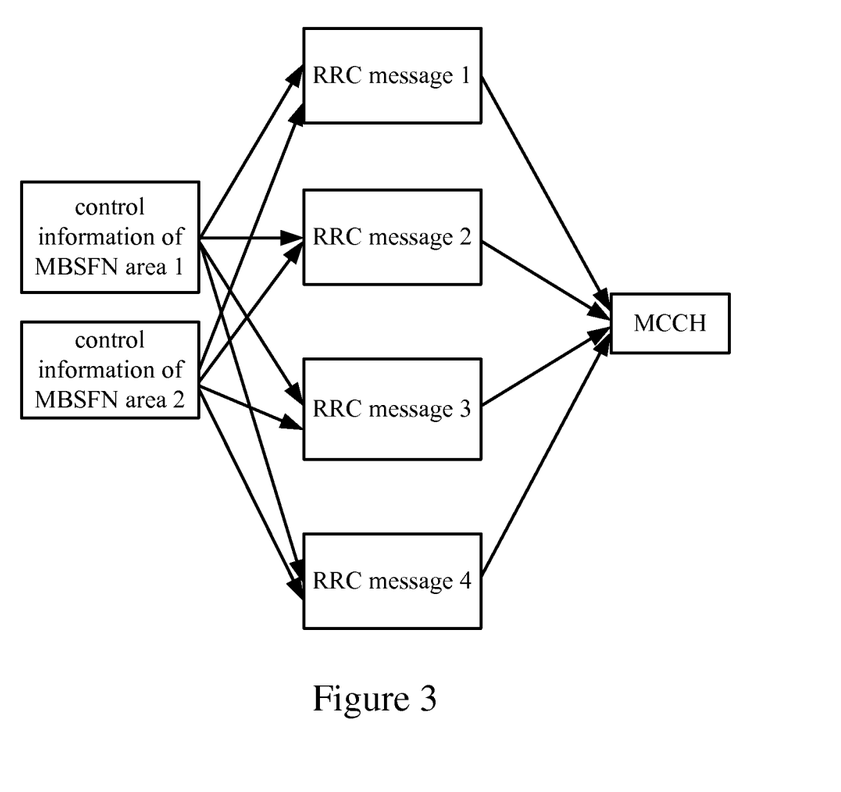
FIG. 3 is a diagram showing another information mapping relationship provided by various embodiments.

In this case, various MCCH information blocks are mapped to multiple RRC messages which are then mapped to one MCCH, the mapping relationship of them may be as shown in FIG. 3. It should be noted that the one MCCH in various embodiments may be a logical MCCH while in fact the logical MCCH may bear multiple MCCH information blocks.

TABLE 2

| message name | message content | |
|---|---|---|
| system message 1 or RRC message 1 | the number of MCCH information blocks | 2 |
| | MCCH information block 1 | MBMS service information of MBSFN area 1: Service 1 |
| | MCCH information block 2 | MBMS service information of MBSFN area 2: Service 4 |
| system message 2 or RRC message 2 | the number of MCCH information blocks | 2 |
| | MCCH information block 1 | MBMS service information of MBSFN area 1: Service 2 |
| | MCCH information block 2 | MBMS service information of MBSFN area 2: Service 3 |
| system message 3 or RRC message 3 | the number of MCCH information blocks | 2 |
| | MCCH information block 1 | MBMS radio resource configuration information of MBSFN area 1 |
| | MCCH information block 2 | MBMS radio resource configuration information of MBSFN area 2 |
| system message 4 or RRC message 4 | the number of MCCH information blocks | 2 |
| | MCCH information block 1 | MBMS service scheduling information of MBSFN area 1 |
| | MCCH information block 2 | MBMS service scheduling information of MBSFN area 2 |

It should be noted that when the indication information is transmitted through an RRC message, the indication information and the control information thereof may be transmitted through the same RRC message.

Based on the above two methods, the UE may acquire the indication information of the control information of various MBSFN areas from the system message(s) or RRC message(s), e.g., the type indication of the control information of each MCCH information block for the current cell means that the specific control information is to be acquired from the corresponding MCCH information blocks according to the UE's own service demands. Supposing that UE1 of LTE R9 is currently located in cell 1 and desires to receive Service 1, UE1 acquires the control information from MCCH information block 1 through the MCCH according to the indication information acquired from the system message(s) or RRC message(s). Supposing that UE2 of LTE R9 is currently located in cell 1 and desires to receive Service 1 and Service 3, UE2 acquires the control information from MCCH information block 1 and MCCH information block 2 through the MCCH according to the indication information acquired from the system message(s) or RRC message(s). So that, the UE of LTE R9 is able to normally receive a service even when overlapped by multiple MBSFN areas.

Figure 4:
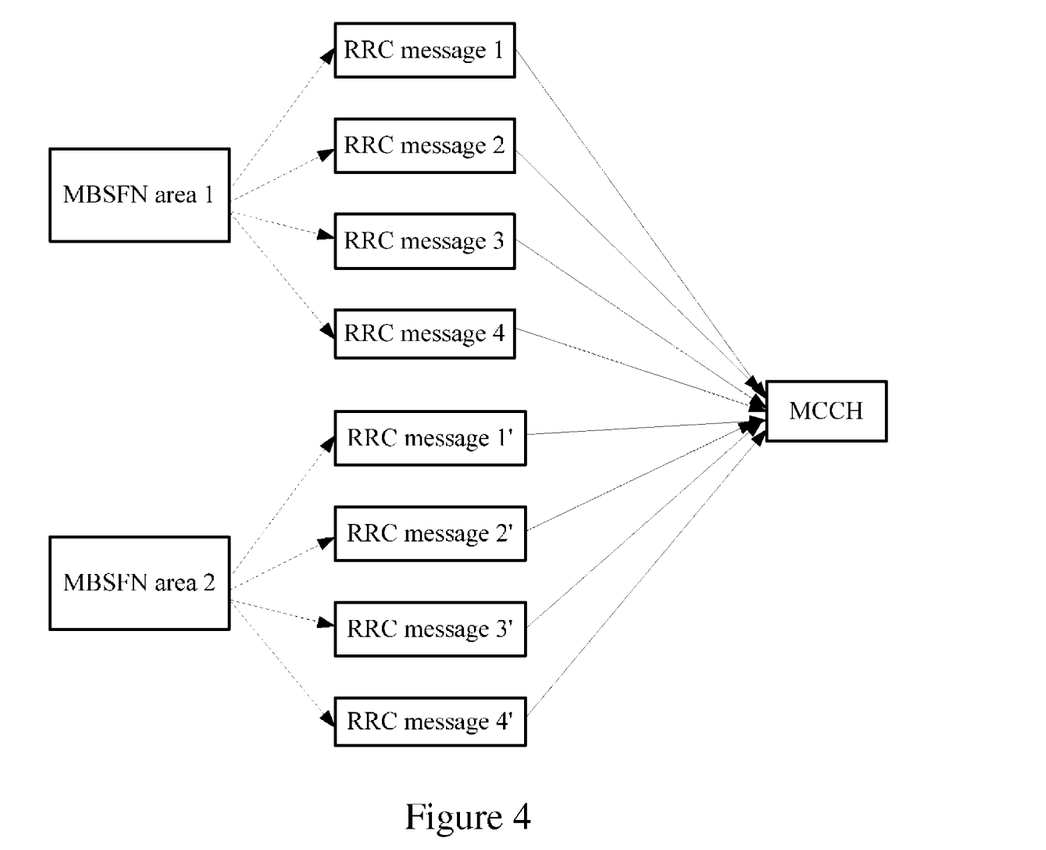
FIG. 4 is a diagram showing multiple RRC messages carrying control information provided by various embodiments.

When the MCCH information blocks are transmitted on the MCCH, they may be carried in different RRC messages if their transmission periods are different, and they can be differentiated by different time-frequency resources. The UE may monitor all the RRC messages to acquire the latest MBMS-related information so as to determine receiving contents and a receiving method, and alternatively may monitor only the RRC message(s) needed to save electronic power. As shown in FIG. 4, suppose that the control information of MBSFN area 1 is carried in RRC messages 1, 2, 3 and 4, the control information of MBSFN area 2 is carried in RRC messages 1', 2', 3' and 4', and theses RRC messages are all mapped to the same MCCH. The UE may monitor all these RRC messages on the MCCH or monitor the RRC message(s) needed according to its own service demands. For example, the UE determines the control information needed is carried in RRC messages 1 and 1' according to the indication information of the control information of the MBSFN area, and then the UE may monitor RRC messages 1 and 1' on the MCCH but not monitor other RRC messages.

Figure 5:
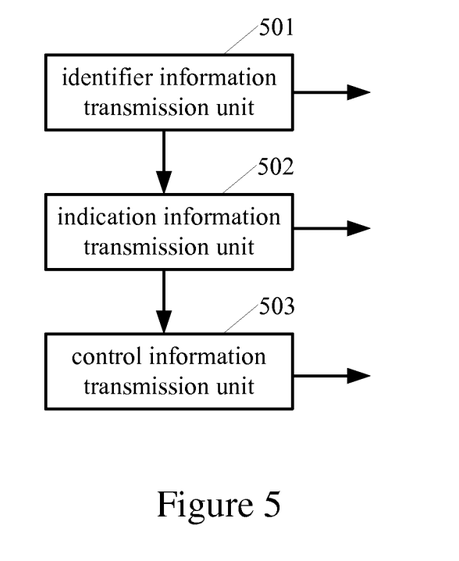
FIG. 5 is a diagram showing a structure of a base station provided by various embodiments.

The above describes the method provided by various embodiments, and the base station and the UE provided by various embodiments are described in detail hereinafter. FIG. 5 is a diagram showing the structure of the base station provided by various embodiments. As shown in FIG. 5, the base station may include an identifier information transmission unit 501, an indication information transmission unit 502 and a control information transmission unit 503.

The identifier information transmission unit 501 is to broadcast identifier information of N MBSFN areas to which the current cell belongs through a system message.

The indication information transmission unit 502 is to transmit indication information of control information of the N MBSFN areas through a system message or an RRC message.

The control information transmission unit 503 is to transmit the control information of the N MBSFN areas respectively through an MCCH according to the indication information where N is an integer with N>1.

Specifically, the identifier information transmission unit 501 carries the identifier information of the N MBSFN areas through an extra SIB added into the system message or an extended SIB therein.

The control information transmission unit 503 carries the control information of the N MBSFN areas in N MCCH information blocks for transmission.

Accordingly, the indication information transmission unit 502 transmits a correspondence relationship between the identifier information of the N MBSFN areas and the N MCCH information blocks through a system message or an RRC signal, and may further transmit type indication of the control information of each MCCH information block.

In the above base station, the indication information transmission unit 502 may transmit the indication information through one system message or RRC message, and alternatively may transmit it through multiple system messages or RRC messages.

The control information transmission unit 503 may transmit the control information of each MBSFN area through one RRC message or multiple RRC messages.

Figure 6:
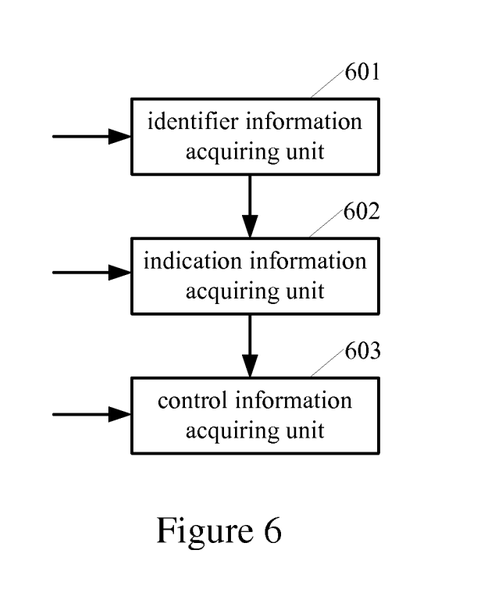
FIG. 6 is a diagram showing a structure of a UE provided by various embodiments.

FIG. 6 is a diagram showing the structure of the UE provided by various embodiments which is applied in the MBMS system. As shown in FIG. 6, the UE may include an identifier information acquiring unit 601, an indication information acquiring unit 602 and a control information acquiring unit 603.

The identifier information acquiring unit 601 is to acquire identifier information of N MBSFN areas to which the current cell belongs through a received system message.

The indication information acquiring unit 602 is to acquire indication information of control information of the N MBSFN areas through a system message or an RRC message.

The control information acquiring unit 603 is to acquire the control information of the N MBSFN areas through an MCCH according to the indication information where N is an integer with N>1.

Specifically, the identifier information acquiring unit 601 acquires the identifier information of the N MBSFN areas from an extra SIB added into the system message or an extended SIB therein.

The control information acquiring unit 603 acquires the specific control information from MCCH information blocks corresponding to the MBSFN areas to which the currently service demands belong according to a correspondence relationship between the identifier information of the N MBSFN areas and N MCCH information blocks. During acquiring of the control information, type indication of the control information of each MCCH information block may be further considered so as to acquire the specific control information from the MCCH information blocks corresponding to the MBSFN areas to which the current service demands belong.

In the above UE, the indication information acquiring unit 602 may acquire the indication information of the control information of the various MBSFN areas through one system message or RRC message, and alternatively may acquire it through multiple system messages or RRC messages.

The control information acquiring unit 603 may acquire the control information of each MBSFN area by listening for one RRC message or multiple RRC messages.

The control information of one MBSFN area involved in the above base station and the UE includes at least one of MBMS service information of the MBSFN area, MBMS radio resource configuration information, MBMS service scheduling information and other MBMS-related information.

It can be seen from the above that in various embodiments, the identifier information of the N MBSFN areas to which the current cell belongs is broadcasted through the system message where N is an integer with N>1, the indication information of the control information of the N MBSFN areas is transmitted through the system message or RRC message, and the control information of the N MBSFN areas is transmitted through the MCCH of the current cell according to the indication information respectively. Various embodiments enable the UE of LTE R9 to acquire corresponding control information to guarantee the UE's normal working when the UE is located in an area including multiple overlapped MBSFN areas and needs to acquire services belonging to different MBSFN areas by providing the control information of the N MBSFN areas simultaneously through the MCCH of the current cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for transmitting control information in a broadcast multicast system, the method comprising:
    broadcasting identifier information of N Multicast Broadcast Single Frequency Network (MBSFN) areas to which a current cell belongs through a system message wherein N is an integer with N>1;
    transmitting indication information of control information of the N MBSFN areas through a system message or a Radio Resource Control (RRC) message; and
    transmitting the control information of the N MBSFN areas respectively through a Multicast Control Channel (MCCH) of the current cell according to the indication information.

2. The method of claim 1, wherein, during broadcasting the identifier information of the N MBSFN areas, the identifier information of at least one of the N MBSFN areas is carried in an extra System Information Block (SIB) added into the system message or in an extended SIB of the system message.

3. The method of claim 1, wherein, the indication information comprises a correspondence relationship between the identifier information of the N MBSFN areas and N MCCH information blocks of the MCCH; and during transmitting the control information of the N MBSFN areas, the control information of the N MBSFN areas is carried in the N MCCH information blocks respectively according to the correspondence relationship comprised in the indication information.

4. The method of claim 1, wherein, the control information of the N MBSFN areas is carried in one RRC message or in multiple RRC messages.

5. The method of claim 1, wherein, the control information of any of the N MBSFN areas comprises at least one of Multimedia Broadcast Multicast Service (MBMS) service information of the MBSFN area, MBMS radio resource configuration information and MBMS service scheduling information.

6. A method for acquiring control information in a broadcast multicast system, the method comprising:
    acquiring identifier information of N Multicast Broadcast Single Frequency Network (MBSFN) areas to which a current cell belongs from a system message received wherein N is an integer with N>1;
    acquiring indication information of control information of the N MBSFN areas through a system message or a Radio Resource Control (RRC) message; and
    acquiring the control information of the N MBSFN areas through a Multicast Control Channel (MCCH) of the current cell according to the indication information.

7. The method of claim 6, wherein, the identifier information of the N MBSFN areas is acquired from an extra System Information Block (SIB) added into the system message or an extended SIB in the system message.

8. The method of claim 6, wherein, the control information is acquired from one or more MCCH information blocks corresponding to one or more of the N MBSFN areas to which a service to be received currently belongs according to a correspondence relationship between the identifier information of the N MBSFN areas and N MCCH information blocks comprised in the indication information.

9. The method of claim 6, wherein, the control information of each MBSFN area is acquired by the UE through monitoring one RRC message or multiple RRC messages.

10. The method of claim 6, wherein, the control information of an MBSFN area comprises at least one of Multimedia Broadcast Multicast Service (MBMS) service information of the MBSFN area, MBMS radio resource configuration information and MBMS service scheduling information.

11. A base station, applied in a broadcast multicast system, comprising an identifier information transmission unit, an indication information transmission unit and a control information transmission unit; wherein
    the identifier information transmission unit is to broadcast identifier information of N Multicast Broadcast Single Frequency Network (MBSFN) areas to which a current cell belongs through a system message wherein N is an integer with N>1;
    the indication information transmission unit is to transmit indication information of control information of the N MBSFN areas through a system message or a Radio Resource Control (RRC) message; and
    the control information transmission unit is to transmit the control information of the N MBSFN areas respectively through a Multicast Control Channel (MCCH) of the current cell according to the indication information.

12. The base station of claim 11, wherein the indication information transmission unit is to transmit the indication information comprising a correspondence relationship between the identifier information of the N MBSFN areas and N MCCH information blocks of the MCCH; and
    the control information transmission unit is to carry the control information of the N MBSFN areas in the N MCCH information blocks during transmission of the control information.

13. The base station of claim 11, wherein, the control information of an MBSFN area comprises at least one of Multimedia Broadcast Multicast Service (MBMS) service information of the MBSFN area, MBMS radio resource configuration information and MBMS service scheduling information.

14. A User Equipment (UE), applied in a broadcast multicast system, comprising an identifier information acquiring unit, an indication information acquiring unit and a control information acquiring unit; wherein
    the identifier information acquiring unit is to acquire identifier information of N Multicast Broadcast Single Frequency Network (MBSFN) areas to which a current cell belongs from a received system message wherein N is an integer with N>1;
    the indication information acquiring unit is to acquire indication information of control information of the N MBSFN areas from a system message or a Radio Resource Control (RRC) message; and the control information acquiring unit is to acquire the control information of the MBSFN areas from a Multicast Control Channel (MCCH) of the current cell according to the indication information.

15. The UE of claim 14, wherein, the control information acquiring unit is to acquire the control information from one or more MCCH information blocks corresponding to one or more of the N MBSFN areas to which a service to be received currently belongs according to a correspondence relationship between the identifier information of the N MBSFN areas and N MCCH information blocks comprised in the indication information.

16. The UE of claim 14, wherein, the control information of an MBSFN area comprises at least one of Multimedia Broadcast Multicast Service (MBMS) service information of the MBSFN area, MBMS radio resource configuration information and MBMS service scheduling information.

* * * * *